US008152063B1

(12) United States Patent
Grant et al.

(10) Patent No.: US 8,152,063 B1
(45) Date of Patent: Apr. 10, 2012

(54) CASE LABELING FOR FIELD-PACKED PRODUCE

(75) Inventors: Elliott Grant, Redwood City, CA (US); J. Scott Carr, Redwood City, CA (US)

(73) Assignee: YottaMark, Inc., Redwood City, CA (US)

( * ) Notice: Subject to any disclaimer, the term of this patent is extended or adjusted under 35 U.S.C. 154(b) by 372 days.

(21) Appl. No.: 12/471,201

(22) Filed: May 22, 2009

(51) Int. Cl.
*G06F 19/00* (2011.01)

(52) U.S. Cl. .......................................... 235/385; 702/19

(58) Field of Classification Search .................. 235/385; 702/19

See application file for complete search history.

(56) References Cited

U.S. PATENT DOCUMENTS

| | | | |
|---|---|---|---|
| 3,329,181 | A | 7/1967 | Buss |
| 4,385,482 | A | 5/1983 | Booth |
| 4,526,404 | A | 7/1985 | Vazquez |
| 4,544,590 | A | 10/1985 | Egan |
| 4,832,204 | A | 5/1989 | Handy et al. |
| 4,846,504 | A | 7/1989 | MacGregor et al. |
| 5,271,642 | A | 12/1993 | Jahier et al. |
| 5,343,529 | A | 8/1994 | Goldfine et al. |
| 5,360,628 | A | 11/1994 | Butland |
| 5,478,990 | A | 12/1995 | Montanari et al. |
| 5,486,686 | A | 1/1996 | Zydbel, Jr. et al. |
| 5,561,970 | A | 10/1996 | Edie et al. |
| 5,569,317 | A | 10/1996 | Sarada et al. |
| 5,592,561 | A | 1/1997 | Moore |
| 5,611,948 | A | 3/1997 | Hawkins |
| 5,619,416 | A | 4/1997 | Kosarew |
| 5,695,071 | A | 12/1997 | Ross et al. |
| 5,768,384 | A | 6/1998 | Berson |
| 5,895,073 | A | 4/1999 | Moore |
| 5,917,925 | A | 6/1999 | Moore |
| 6,005,960 | A | 12/1999 | Moore |
| 6,041,929 | A | 3/2000 | Brunner et al. |
| 6,203,069 | B1 | 3/2001 | Outwater et al. |
| 6,211,789 | B1 | 4/2001 | Oldham et al. |
| 6,212,638 | B1 | 4/2001 | Lee et al. |
| 6,226,619 | B1 | 5/2001 | Halperin et al. |
| 6,231,435 | B1 | 5/2001 | Pilger |

(Continued)

FOREIGN PATENT DOCUMENTS

CN 1350265 A 5/2002

(Continued)

OTHER PUBLICATIONS

PCT/US08/75626 International Search Report and Written Opinion, Nov. 26, 2008.

(Continued)

*Primary Examiner* — Kristy A Haupt
(74) *Attorney, Agent, or Firm* — Peters Verny, LLP

(57) ABSTRACT

Rolls of pre-printed case labels are distributed at a harvest for labeling the cases of packed produce. The labels on each roll include common information such as the type of produce, the packing configuration, the country of origin, the company identifier, and a SKU. Labels on the same roll include a common batch number, while labels on different rolls include different batch numbers. The company, SKU and batch numbers are subsequently associated in a database with harvest event data to provide traceability back to the harvest and forward from the harvest to those cases packed at that harvest. Optionally, each label can also include a unique code, a field to place a date stamp, and/or a field to place a ranch stamp.

16 Claims, 4 Drawing Sheets

U.S. PATENT DOCUMENTS

| | | | |
|---|---|---|---|
| 6,246,778 | B1 | 6/2001 | Moore |
| 6,297,508 | B1 | 10/2001 | Barmore et al. |
| 6,314,337 | B1 | 11/2001 | Marcum |
| 6,329,920 | B1 | 12/2001 | Morrison et al. |
| 6,342,839 | B1 | 1/2002 | Curkendall et al. |
| 6,346,885 | B1 | 2/2002 | Curkendall |
| 6,361,079 | B1 | 3/2002 | Kirkman |
| 6,364,990 | B1 | 4/2002 | Grosskopf et al. |
| 6,398,106 | B1 | 6/2002 | Ulvr et al. |
| 6,409,082 | B1 | 6/2002 | Davis et al. |
| 6,428,640 | B1 | 8/2002 | Stevens et al. |
| 6,442,276 | B1 | 8/2002 | Doljack |
| 6,456,729 | B1 | 9/2002 | Moore |
| 6,536,672 | B1 | 3/2003 | Outwater |
| 6,547,137 | B1 | 4/2003 | Begelfer et al. |
| 6,612,494 | B1 | 9/2003 | Outwater |
| 6,664,897 | B2 | 12/2003 | Pape et al. |
| 6,680,783 | B1 | 1/2004 | Pierce et al. |
| 6,766,324 | B2 | 7/2004 | Carlson et al. |
| 6,788,800 | B1 | 9/2004 | Carr et al. |
| 6,796,504 | B2 | 9/2004 | Robinson |
| 6,805,926 | B2 | 10/2004 | Cote et al. |
| 6,806,478 | B1 | 10/2004 | Hatfield |
| 6,808,574 | B1 | 10/2004 | Stevens et al. |
| 6,859,672 | B2 | 2/2005 | Roberts et al. |
| 6,974,298 | B2 | 12/2005 | Tanaka |
| 6,991,261 | B2 | 1/2006 | Dronzek, Jr. et al. |
| 6,995,675 | B2 | 2/2006 | Curkendall et al. |
| 7,013,286 | B1 | 3/2006 | Aggarwal et al. |
| 7,040,532 | B1 | 5/2006 | Taylor et al. |
| 7,207,481 | B2 | 4/2007 | Barenburg et al. |
| 7,211,163 | B2 | 5/2007 | Kennedy |
| 7,222,791 | B2 | 5/2007 | Heilper et al. |
| 7,261,235 | B2 | 8/2007 | Barenburg et al. |
| 7,277,601 | B2 | 10/2007 | Zorab et al. |
| 7,283,630 | B1 | 10/2007 | Doljack |
| 7,295,114 | B1 | 11/2007 | Drzaic et al. |
| 7,321,310 | B2 | 1/2008 | Curkendall et al. |
| 7,412,461 | B2 | 8/2008 | Sholl et al. |
| 7,519,825 | B2 | 4/2009 | Geoffrey |
| 7,686,513 | B2 | 3/2010 | Knoerzer et al. |
| 7,705,735 | B2 | 4/2010 | Pape et al. |
| 7,714,729 | B2 | 5/2010 | Pape et al. |
| 7,766,240 | B1 | 8/2010 | Grant |
| 7,827,058 | B2 | 11/2010 | Mortimer |
| 7,909,239 | B2 | 3/2011 | Grant et al. |
| 2001/0056359 | A1 | 12/2001 | Abreu |
| 2002/0004767 | A1 | 1/2002 | Okamoto et al. |
| 2002/0158765 | A1 | 10/2002 | Pape et al. |
| 2002/0178363 | A1 | 11/2002 | Ambrogio et al. |
| 2003/0019186 | A1 | 1/2003 | Hakansson |
| 2003/0080191 | A1 | 5/2003 | Lubow et al. |
| 2003/0089078 | A1 | 5/2003 | Cristina |
| 2003/0177025 | A1 | 9/2003 | Curkendall et al. |
| 2003/0177095 | A1 | 9/2003 | Zorab et al. |
| 2003/0185948 | A1 | 10/2003 | Garwood |
| 2003/0221108 | A1 | 11/2003 | Rupp |
| 2004/0159527 | A1 | 8/2004 | Williamson |
| 2004/0200892 | A1 | 10/2004 | Curkendall et al. |
| 2004/0205343 | A1 | 10/2004 | Forth et al. |
| 2005/0004682 | A1 | 1/2005 | Gaddis et al. |
| 2005/0075900 | A1 | 4/2005 | Arguimbau |
| 2005/0082376 | A1 | 4/2005 | Lubow et al. |
| 2005/0097054 | A1 | 5/2005 | Dillon |
| 2005/0108044 | A1 | 5/2005 | Koster |
| 2005/0247778 | A1 | 11/2005 | Roberts |
| 2005/0251449 | A1 | 11/2005 | Pape et al. |
| 2006/0004907 | A1 | 1/2006 | Pape et al. |
| 2006/0054682 | A1 | 3/2006 | de la Huerga et al. |
| 2006/0100964 | A1 | 5/2006 | Wilde et al. |
| 2006/0111845 | A1 * | 5/2006 | Forbis et al. .................... 702/19 |
| 2006/0161443 | A1 | 7/2006 | Rollins |
| 2006/0180661 | A1 | 8/2006 | Grant et al. |
| 2006/0187048 | A1 | 8/2006 | Curkendall et al. |
| 2006/0259182 | A1 | 11/2006 | Mantell |
| 2006/0260495 | A1 | 11/2006 | Siedlaczek |
| 2007/0051362 | A1 | 3/2007 | Sullivan et al. |
| 2007/0119954 | A1 | 5/2007 | Barenburg et al. |
| 2007/0119955 | A1 | 5/2007 | Barenburg et al. |
| 2007/0170240 | A1 | 7/2007 | Grant et al. |
| 2007/0175974 | A1 | 8/2007 | Self et al. |
| 2007/0203724 | A1 | 8/2007 | Farmer et al. |
| 2007/0203818 | A1 | 8/2007 | Farmer et al. |
| 2007/0205258 | A1 | 9/2007 | Self et al. |
| 2008/0011841 | A1 | 1/2008 | Self et al. |
| 2008/0011843 | A1 | 1/2008 | Barenburg et al. |
| 2008/0023472 | A1 | 1/2008 | Brandt |
| 2008/0030348 | A1 | 2/2008 | Pape et al. |
| 2008/0046263 | A1 | 2/2008 | Sager et al. |
| 2008/0143094 | A1 | 6/2008 | Goetz |
| 2008/0178197 | A1 | 7/2008 | Pape et al. |
| 2008/0215484 | A1 | 9/2008 | Oldham et al. |
| 2009/0242631 | A1 | 10/2009 | Wishnatzki et al. |
| 2010/0106660 | A1 | 4/2010 | Farmer et al. |
| 2011/0098026 | A1 | 4/2011 | Uland |

FOREIGN PATENT DOCUMENTS

| | | | |
|---|---|---|---|
| WO | 03007252 | A1 | 1/2003 |
| WO | 2006084090 | A2 | 8/2006 |
| WO | WO 2007140018 | A2 * | 12/2007 |

OTHER PUBLICATIONS

Secure Symbology, Inc. Business Overview, May 2008.

Paul Chang, IBM Industry Forum 2010, Mexico Industry Event, 2010.

U.S. Appl. No. 12/206,156 Office action, mailed Nov. 15, 2010.

U.S. Appl. No. 12/206,156 Applicants' Amendment A, filed Jan. 10, 2011.

PCT/US06/03768 International Search Report and Written Opinion, Jun. 12, 2008.

U.S. Appl. No. 12/359,151 Office action, mailed Mar. 3, 2011.

U.S. Appl. No. 12/359,151 Applicants' Amendment A, filed Mar. 25, 2011.

U.S. Appl. No. 12/359,151 Final Office Action, mailed May 25, 2011.

U.S. Appl. No. 12/359,151 Applicants' Amendment B, submitted Jul. 22, 2011.

U.S. Appl. No. 12/370,346 Non-Final Office Action, mailed Aug. 9, 2011.

U.S. Appl. No. 12/501,240 Non-Final Office Action, mailed Jun. 7, 2011.

U.S. Appl. No. 13/221,520, Elliott Grant, Case Labeling for Field-Packed Produce, filed Aug. 30, 2011.

* cited by examiner

CASE LABELING FOR FIELD-PACKED PRODUCE

CROSS-REFERENCE TO RELATED APPLICATIONS

This application is related to U.S. patent application Ser. No. 12/370,346 filed Feb. 12, 2009 and entitled "Systems and Methods of Associating Individual Packages with Harvest Crates," U.S. patent application Ser. No. 12/206,156 filed Sep. 8, 2008 and entitled "Attributing Harvest Information with Unique Identifiers," now U.S. Pat. No. 7,909,239, U.S. patent application Ser. No. 12/176,334 filed Jul. 19, 2008 and entitled "Case-Level Traceability Without the Need for Inline Printing," now U.S. Pat. No. 7,766,240, and U.S. patent application Ser. No. 12/414,123 filed Mar. 30, 2009 and entitled "Parent Case Labels with Multiple Child Labels for Field Packed Produce" now abandoned. Each of the aforementioned applications is incorporated herein by reference.

BACKGROUND OF THE INVENTION

1. Field of the Invention

The invention relates generally to the field of product traceability and more particularly to labels that can be used to associate information with cases of produce.

2. Description of the Prior Art

The Produce Traceability Initiative (PTI) is an initiative designed to improve traceability through the entire produce supply chain from the point of harvest to the point of sale. Compliance with the initiative requires printing a date- and a stock-keeping unit (SKU)-specific label on every case. For field-packed produce, this labeling requirement creates several challenges.

First, printing labels in the field is impractical due to technology and cost limitations. Printing labels in advance is not a suitable alternative because the number of labels that will be needed on any particular date can be difficult to predict. Similarly, the appropriate SKU or SKUs for a particular date can also be difficult to predict. For example, it may not be determined until just before a strawberry field is harvested whether the berries will be packed in 11*b* or 21*b* clamshells, and the correct SKU depends on the packaging. Printing enough labels to cover all eventualities for any particular day leads to significant waste of unused labels and unacceptable cost. Lastly, it is possible to print and apply labels at a location away from the field, such as when the cases and pallets reach the cooler, but doing so slows down receiving at the cooler and can be logistically impractical.

SUMMARY

Methods for labeling cases of field-packed produce are provided. An exemplary method comprises distributing rolls of labels at a harvest event where each label of every roll including a common code including a company identifier and a SKU, where each label on each roll has a common batch number, and where the batch numbers on the labels of different rolls are different. The method further comprises removing case labels from the rolls and affixing the labels to produce cases before, during or after the harvest event, and storing associations between the batch numbers and harvest event data for the harvest event. In various embodiments the common code comprises a GTIN. The batch number and the common code can be arranged in series using industry standard headers to form a composite code, in some instances. The common code can be displayed in either or both a human-readable format and a machine-readable format. The exemplary method can further comprise stamping either or both of the date and a ranch stamp on each case label. The exemplary method can further comprise marking the date on each case label with a date label, for example, with a label gun or writing by hand.

In various embodiments, storing the associations includes reading the batch numbers from the case labels, such as with a handheld scanner. In other embodiments, storing the associations includes affixing another case label from each distributed roll to a harvest form. In some of these latter embodiments storing the associations includes reading the batch numbers from the case labels on the harvest forms. Also, some of these latter embodiments further comprise entering harvest event data on the harvest form.

Case labels are also provided herein for field-labeling produce cases. An exemplary set of case labels comprises a plurality of rolls of labels. Each label of every roll includes a common code including a company identifier and a SKU. Further, each label on each roll has a common batch number, and the batch numbers on the labels of different rolls are different. Each label in the set can also include a unique code, in some embodiments. Each label in the set can further comprise any or all of a commodity or variety of produce, a packing configuration, a country of origin, a URL, a filed for stamping the date, and a field for stamping a ranch stamp.

Another exemplary method comprises printing multiple sets of rolls of case labels. Within each set of rolls each case label of every roll includes a common SKU, each case label on each roll has a common batch number, and the batch numbers on the case labels of different rolls are different. The sets are differentiated in that the common SKU for each set is different. The exemplary method further comprises storing, for each set, associations between the SKU for the set and the batch numbers of the rolls of the set. The exemplary method further can comprise printing a unique code on each case label. Some embodiments further comprise selecting a set of rolls of case labels based on the SKU for the set, and distributing the rolls of the set at a harvest event. In some of the embodiments the method further comprises labeling cases of produce from the harvest event with case labels from the distributed rolls and storing associations between the batch numbers and harvest event data for the harvest event.

DETAILED DESCRIPTION OF THE INVENTION

The present invention provides pre-printed case labels that can be conveniently affixed to cases of produce in the field during a harvest to provide case-level traceability. The case labels are pre-printed with a batch number and information about the harvested produce, including a company identifier and a SKU, but are not pre-printed with the harvest date. The case labels can be provided on rolls, where each case label on a roll has the same batch number, but the case labels on different rolls have different batch numbers. Harvest event data, such as the date, can be associated with the batch, company identifier and a SKU numbers and stored for later use, should a question ever arise that requires tracing back through the distribution chain. It will be understood that although the present invention is illustrated below with specific reference to the traceability of field-packed produce, the present invention can also be used to provide traceability to other commodities as well, such as seafood or nuts.

Figure 1:
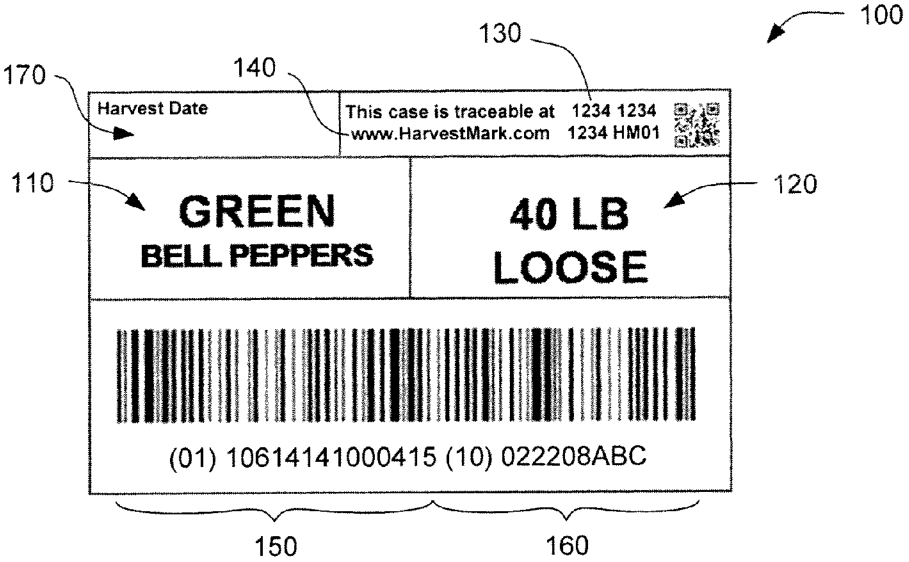
FIG. 1 provides a case label according to an exemplary embodiment of the present invention.
Figure 2:
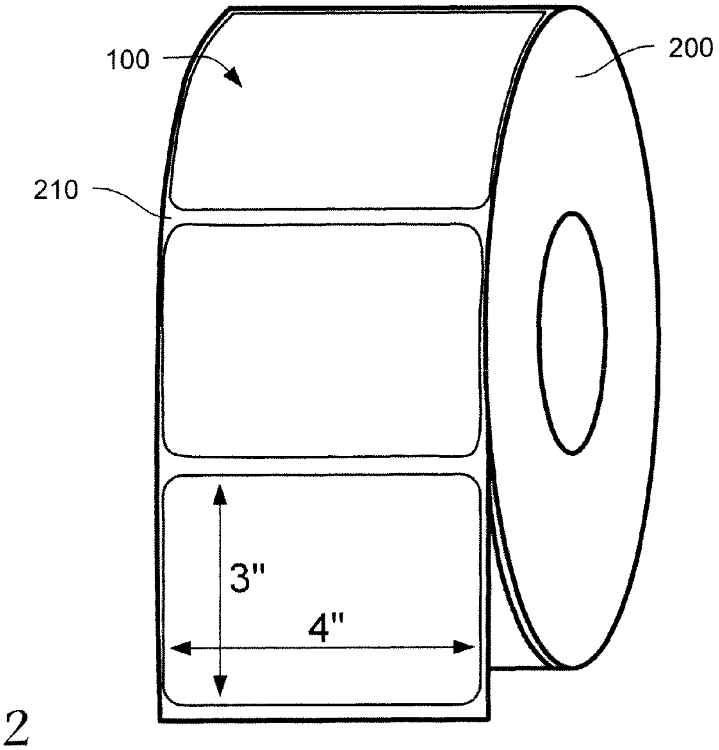
FIG. 2 shows a roll of case labels according to an exemplary embodiment of the present invention.

FIG. 1 illustrates a pre-printed case label 100 according to an exemplary embodiment. The case label 100, in some embodiments, can include an adhesive backing, though it will be appreciated that the case label 100 can also be secured to a case in other ways. The case label 100 can be one of a plurality of case labels 100 on a roll 200 as seen in FIG. 2. Harvest crews, working in the field, take rolls 200 of case labels 100 and affix the case labels 100 to cases of produce that are part of a common lot. Methods for associating information with the case labels 100 are discussed in greater detail below with respect to FIG. 3.

The case label 100 comprises several fields to provide various information. In some embodiments, the case label 100 includes a field for the commodity or variety of the produce to be packed 110, green bell peppers in the example of FIG. 1. The case label 100 can also include a field for the packing configuration 120 (e.g. 40 LB loose). The name and address of the packer or shipper and/or the country of origin can be in still other fields on the case label 100 if not otherwise pre-printed on the case.

In some embodiments, the case label 100 also comprises a field including a unique code 130 that represents a case serial number, and in further embodiments the same or another field comprises a URL 140 for a website through which lot-specific information can be obtained, and feedback given, for the given unique code 130. Exemplary methods for generating and printing suitable unique codes are described, for example, in U.S. patent application Ser. No. 11/743,648 filed on May 2, 2007 and entitled "System and Method of Product Information Coding and Authentication" which is a Continuation-in-Part of U.S. patent application Ser. No. 11/347,424 filed on Feb. 2, 2006 and entitled "Method and System for Deterring Product Counterfeiting, Diversion and Piracy," which claims priority from U.S. Provisional Patent Application No. 60/650,364 filed on Feb. 3, 2005 and entitled "System, Method and Technique for Combating Product Counterfeiting, Piracy and Diversion," each of which is incorporated herein by reference.

Still another field can provide a code 150 that represents the packaging level, a company identifier, a SKU number, and a checksum digit. An exemplary company identifier comprises a GS1 company prefix such as "0641414" in FIG. 1. In some embodiments code 150 is 14 digits and comprises a Global Trade Item Number (GTIN). The code 150 can be in either or both of a machine-readable format and a human-readable format, and is shown in FIG. 1 as human-readable text beneath a machine-readable GS1-128 barcode. In the illustrated embodiment, the code 150 is preceded by the Application Identifier (01) to indicate that it is a GS1 standard GTIN.

Yet another field can provide a lot or batch number 160 that is used to associate information with the contents of the labeled cases. The batch number 160 can be up to 20 alphanumeric characters, in some instances. In other instances the batch number 160 can consist of any integer number of alphanumeric characters from one to 20, such as the nine alphanumeric characters in the illustrated embodiment. More commonly, the batch number 160 consists of six to 15 alphanumeric characters. The batch number 160 can also be in either or both of a machine-readable format and a human-readable format. In FIG. 1 the batch number 160 is shown as human readable text beneath a GS 1-128 barcode. In the illustrated embodiment, the batch number 160 is preceded by the Application Identifier (10) to indicate that it is a GS1 standard batch number. In some embodiments the code 150 and the batch number 160 are arranged in series to form a composite code, as shown in FIG. 1.

In some instances a harvest or pack date may be required, such as by the retailer, and in these instances the case label 100 can further include a field 170 where the date can be added to the label at the time of use. In some embodiments, the field 170 includes the word "date" alone or in a short phrase such as "harvest date" or "stamp date here." It will be appreciated that the date of use will typically not be known in advance at the time that the case labels 100 are printed, thus the date itself is not pre-printed. Still another blank field (not shown) that can be included on the case label 100 is one to receive a ranch stamp or similar identifying mark to identify the ranch and/or ranch lot without having to resort to a database look-up.

As noted above, FIG. 2 illustrates a roll 200 of case labels 100 disposed on a backing 210. The rolls 200 can be pre-printed, for example on a thermal transfer printer with a rewinder or a flexographic web press with variable data capability, days or months prior to use in a harvest. Exemplary rolls 200 comprise 500 to 2,000 labels, depending on the size of the roll 200, the size of the core, and the size and orientation of the case labels 100. In some embodiments, rolls 200 comprise 1,950 case labels 100. As noted in FIG. 2, an exemplary case label 100 is approximately 3" high×4" wide. In a set of rolls 200, every case label 100 on every roll 200 in a set has the same company identifier and SKU-specific information, every case label 100 shares a common batch number 160 on each roll 200 that differs from roll 200 to roll 200, and every case label 100 on a roll 200 optionally can have a unique code 130. It will be appreciated that in the alternative to rolls 200, the case labels 100 can also be provided on sheets and fan-folded strips.

The system that prints the case labels 100 also stores company, SKU and batch information, and any ranges of unique codes 130 that were printed, either locally or uploads the information to be stored by a central server that may be either an enterprise server or a hosted server, for example. The printing system or the central server can store a plurality of batch numbers 160 in association with a particular record of information that is common to all of the case labels 100 on each of the rolls 200 in the set such as SKU, company name, country of origin, and so forth. For each batch number 160, any ranges of unique codes 130 that were printed on the case labels 100 bearing that batch number 160 are also stored. The information can be stored in database that resides in a memory device such as a hard disk drive, a magnetic tape, a Compact Disc, a random access memory (RAM), and so forth.

Figure 3:
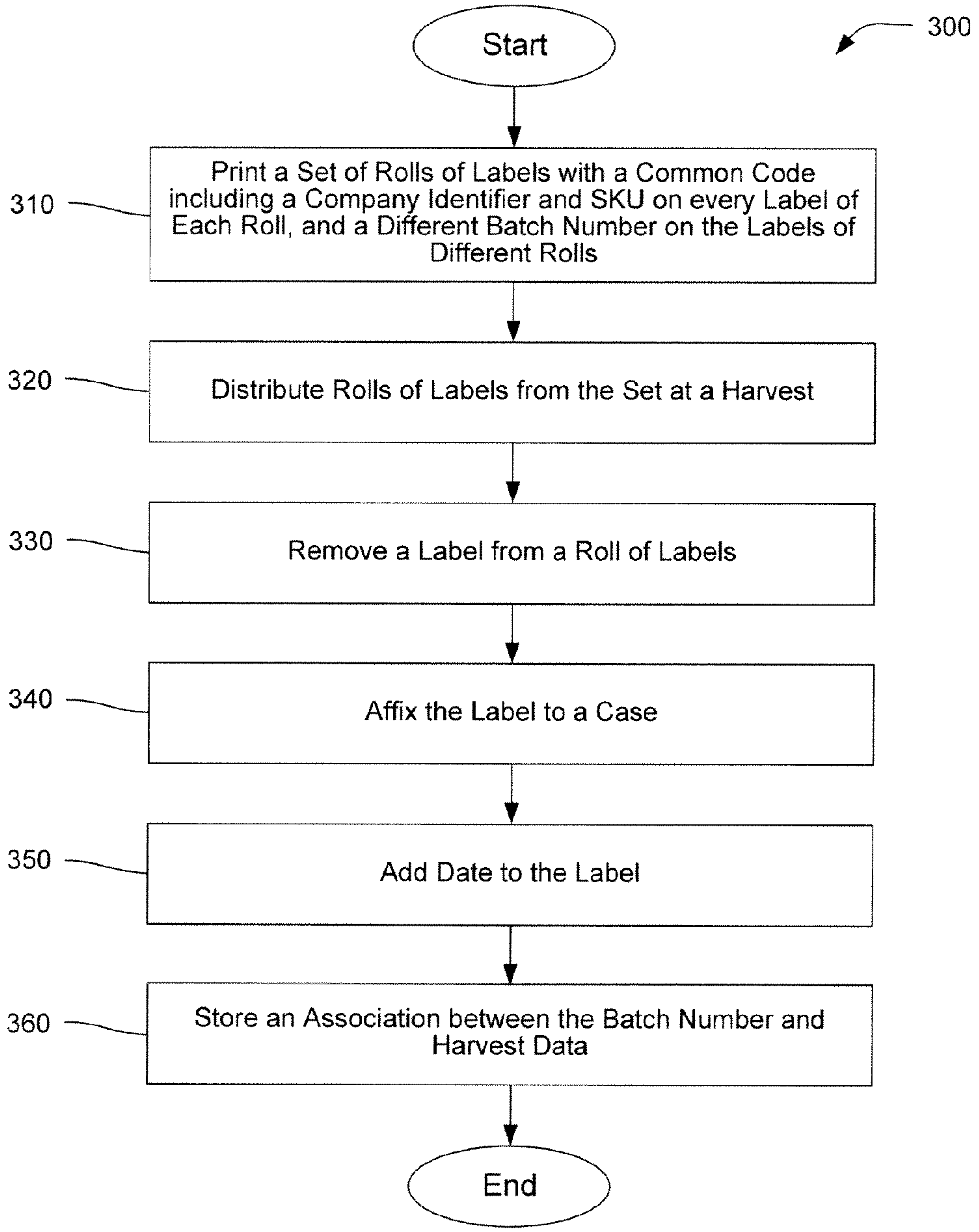
FIG. 3 shows a flowchart representation of a method for providing case-level traceability according to an exemplary embodiment of the present invention.

Methods for providing case-level traceability are also provided herein. FIG. 3 is a flowchart representation of an exemplary method 300 for providing case-level traceability to field-harvested produce. The method 300 comprises a step 310 of printing a plurality of case labels 100, for example, for use in conjunction with harvesting green bell peppers. For instance, the plurality of case labels 100 can be printed and wound onto a number of rolls 200 that collectively comprise a set of rolls 200. Each case label 100 of each roll 200 of the set includes certain common information such as the company, SKU, the country of origin, etc. Since different packaging for the same produce requires a different SKU, several sets of rolls 200 can be printed in step 310, one set for each SKU that may be used for a particular harvest. Those sets of rolls 200 that are not actually used because they comprised SKUs that were not appropriate for a particular harvest can be retained for a subsequent harvest. Even those unused rolls 200 from a set that is used are not wasted as they can be added to another set of rolls 200 bearing the same SKU.

In addition to printing the same information on every case label 100 of a roll 200, the step 310 also comprises printing different batch numbers 160 on different rolls 200 within the set. In some embodiments, each roll 200 comprises a separate batch number 160, though it will be appreciated that having more than one roll 200 associated with the same batch number 160 will still work, although it is less desirable. Likewise, the step 310 can also comprise printing a unique code 130 on every case label 100. Further, the step 310 also comprises storing information about the case labels 100 for late retrieval. As noted above, information common across all of the case labels 100 in the set of rolls 200 is stored in association with those batch numbers 160 used for the various rolls 200, and ranges of unique codes 130 can be further associated with particular batch numbers 160, in various embodiments.

As noted previously, factors such as market forces can dictate which of several possible SKUs will be used as the time of harvest. Accordingly, step 310 can comprise printing more than one set of rolls 200, one set for each possible SKU that might be used. At the time of harvest, a particular SKU is selected for the harvest and the set of rolls 200 for the desired SKU is brought to the harvest.

The method 300 further comprises a step 320 of distributing rolls 200 of case labels 100 from the set at the harvest. For example, packers working in the field being harvested are provided with rolls 200. Each packer can receive a roll 200, however, since the rolls 200 are not identified to the packers, packers also can share rolls 200. A packer that finishes a roll 200 can obtain from the set a new roll 200 having a different batch number 160.

The method 300 further comprises a step 330 of removing a case label 100 from a roll 200 of case labels 100 and a step 340 of affixing the case label 100 to a case. These steps are repeated for each case that is packed. Case labels 100 can be removed and affixed manually, or through the use of a labeling gun or labeling machine, for example. Case labels 100 can be affixed to the produce cases either before, during, or after the harvest event. Case labels 100 can also be affixed to the produce cases before or after the produce cases are packed.

The method 300 can also include an optional step of adding the date to the case label 100. It will be understood that the harvest event data that is associated with the SKU and batch number 160 in the step 360 (discussed below) will typically include the date, so adding the date to the case label 100 in step 350 is not essential to recording the date. However, in some instances having a harvest or packing date visible on the exterior of a case is either desirable or required. In various embodiments the date is added by stamping the case label 100 with an inked stamp. In other embodiments the case label 100 is itself labeled with the date, such as with a labeling gun. Step 350 can be performed in the field or later, for example, when the cases are palletized such as at the cooler.

Figure 4:
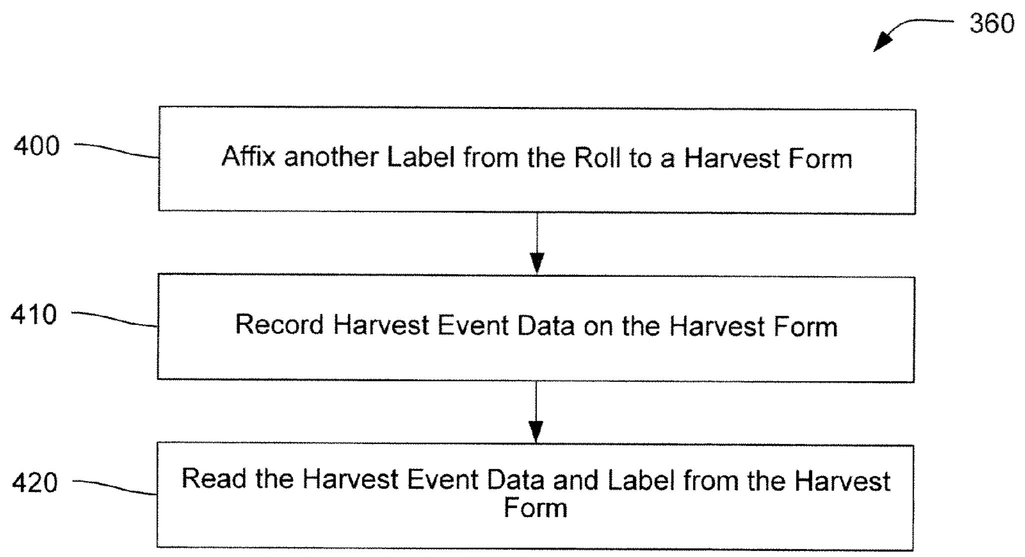
FIGS. 4 and 6 each show a flowchart representations alternative methods for storing an association between a batch number and harvest data, according to two exemplary embodiments of the present invention.
Figure 6:
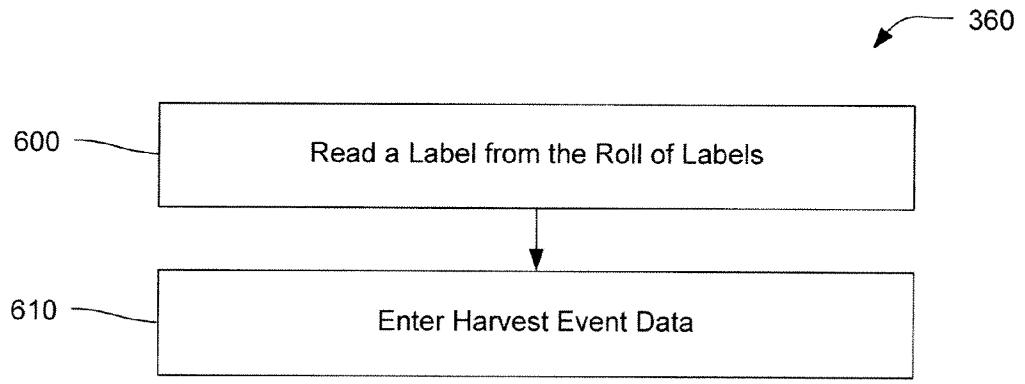

The method 300 further comprises a step 360 of storing an association between the batch number 160 and harvest event data. Step 360 can be performed in a number of ways. One method for performing step 360 is illustrated in FIG. 4. The method shown in FIG. 4 comprises a step 400 of affixing another case label 100 from the roll 200 to a harvest form, a step 410 of recording harvest event data on the harvest form, and a step 420 of reading the harvest event data and label from the harvest form. This method is further illustrated with reference to FIG. 5.

Figure 5:
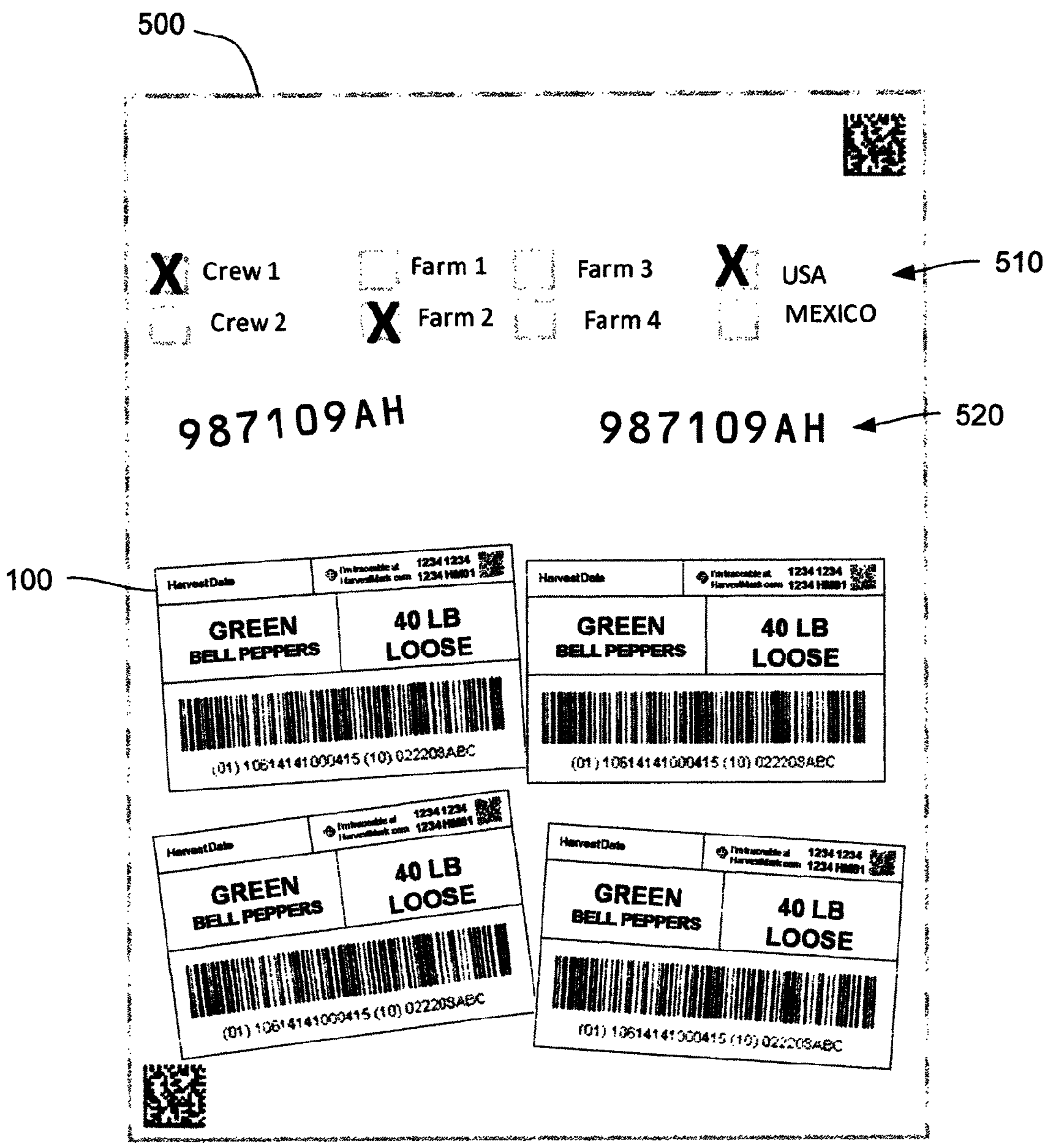
FIG. 5 shows a harvest form used to associate case labels with harvest event data according to an exemplary embodiment of the present invention.

FIG. 5 shows a harvest form 500 including case labels 100 from rolls 200 used during the harvest and affixed to the harvest form 500 in the step 400. The harvest form 500 also includes harvest event data added during step 410. The harvest event data can comprise any or all of hand-written entries, check boxes 510, and harvest stamps 520. Check boxes 510 provide convenience and can be machine read, in some instances. A harvest stamp 520 is a marking made by a rubber stamp (also referred to as a harvest stamp) that includes numbers and/or letters that is commonly used to stamp cases of produce. The harvest stamp 520 can encode information such the ranch, the date, etc. but typically will have no meaning to the casual observer.

Referring again to FIG. 4, in step 420 harvest event data and the one or more case labels 100 from the harvest form 500 are read. Reading the case label 100 can comprise scanning the case label 100, for example, with a barcode reader embodied in a handheld scanner connected to a PC. Reading the harvest event data can likewise be performed by an optical scanner configured to read check boxes and/or to perform optical character recognition. A flatbed scanner can be used to create an electronic image of the harvest form for processing and record keeping purposes. Reading 420 the harvest form can be performed away from the field to keep electronic scanning equipment clean of dust and dirt. Information read from the case label 100 such as the batch number 160 and the code 150 can be stored in association with the harvest event data in a local or remote database, as previously provided.

In the alternative to using harvest forms 500, step 360 can be carried out by reading, in a step 600, a case label 100 from each roll 200 that is distributed in step 320. Each case label 100 can be read by scanning with a handheld scanner, for example, either while the case label 100 is still on the roll 200 or after the case label 100 has been affixed to a case. More specifically, either the batch number 160 is read, or in some instances a unique code 130 is read. The unique code 130, having been associated previously with the batch number, can always be used to find the batch number 160.

In a step 610 harvest event data is also entered. Harvest event data can be entered, in some embodiments, through the same scanner used to read the case label 100 in step 600, for example with a touch-screen. In other embodiments, the scanner is used to scan selected barcodes from a preprinted laminated card or sheet to assign data. Combinations of scanning barcodes and entering data through the scanner can also be used. In some embodiments, the scanner prompts the user to scan a case label 100 and then prompts the user to enter the harvest event data, and in this way the scanner associates the harvest event data to the information read from the case label 100. The associated information can then be uploaded from the scanner and stored as described above.

As previously noted, partially used rolls 200 that remain after a harvest is completed do not need to be wasted, but can instead be used in a subsequent harvest where the same SKU is required. It will be understood that reusing a roll 200 will result in the same batch number 160 being associated with more than one harvest event. As will be explained below, although this can create a degree of ambiguity, the ambiguity does not pose a meaningful obstacle.

In the event that a situation arises in which the source of a unit of produce needs to be determined, the database that stores the harvest event data in association with information read from the case labels 100 can be queried based on whatever information is available at the time to narrow the search for the source to a particular harvest event. Once a harvest event has been identified, the database can be used to then trace forward to find all other cases associated with that harvest event. In the event that a roll 200 of labels 100 was used for two harvest events, for example, then tracing backward would identify two harvest events as the source. In most situations, however, the true source will become evident as other independent units are traced backward to only one of the two harvest events. Even if the one unit is the only one traced backward, being able to quickly narrow a source of a problem to two possible harvest events is still a substantial narrowing so that any remedial action can be narrowly tailored.

In an industry where profit margins are often razor thin, the present invention provides traceability back to a harvest event and forward from the harvest event to those cases packed at that harvest event through the use of very inexpensive pre-printed labels 100 that may also satisfy various other labeling requirements, such as a requirement to display country of origin. The capital equipment costs to implement the invention are modest, comprising scanning equipment, computer equipment, and networking equipment. The application of pre-printed labels 100 is so fast and simple that the labor cost to implement the invention is negligible. In some embodiments additional information like the date is added to the labels 100 at the time of the harvest event, however, in these embodiments the additional information is added through the use, for example, of inked rubber stamps which are well suited for use in harvest fields, and also very inexpensive and simple to use.

Some steps of the methods described herein can be performed, for example, through the use of hardware, such as application-specific integrated circuits (ASICs), specifically designed to perform the particular functions of the method. Various steps of the methods described herein can also be performed through the use of firmware residing, for instance, in read only memory (ROM) or flash memory, where the firmware is programmed to perform the particular functions of the method steps. Steps of the methods described herein can also be performed by a processor capable of executing software residing in a memory, for example, in random access memory (RAM), where the computer instructions embodied in the software define the method steps. Any combination of two or more of hardware, firmware, and software can also be employed. Hardware, firmware, and/or software for implementing method steps may be embodied in handheld scanners, for example. Hardware, firmware, and/or software for implementing method steps may also be embodied in various types of computing systems such as servers and personal computers. It will be appreciated that such computing systems, when configured to follow specific logic embodied in their circuits or programming instructions, or both, constitute specific machines.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for labeling cases of field-packed produce comprising:

distributing rolls of labels at a harvest event, each label of every roll including a common code including a company identifier and a SKU, and each label on each roll having a common batch number, where the batch numbers on the labels of different rolls are different;

removing case labels from the rolls and affixing the labels to produce cases before, during or after the harvest event; and storing associations between the batch numbers and harvest event data for the harvest event.

2. The method of claim 1 wherein the common code comprises a GTIN.

3. The method of claim 1 wherein storing the associations includes reading the batch numbers from the case labels.

4. The method of claim 1 wherein storing the associations includes affixing another case label from each distributed roll to a harvest form.

5. The method of claim 4 wherein storing the associations includes reading the batch numbers from the case labels on the harvest forms.

6. The method of claim 4 further comprising entering harvest event data on the harvest form.

7. The method of claim 1 wherein the batch number and the common code are arranged in series.

8. The method of claim 1 wherein the common code is in both a human-readable format and a machine-readable format.

9. The method of claim 1 further comprising stamping each case label with a ranch stamp.

10. The method of claim 1 further comprising marking the date on each case label.

11. The method of claim 10 wherein marking the date on each case label includes stamping the date.

12. The method of claim 10 wherein marking the date on each case label includes affixing a date label to each case label.

13. A method comprising:

printing multiple sets of rolls of case labels, where, for each set each case label of every roll includes a common code including a company identifier and SKU, each case label on each roll has a common batch number, and the batch numbers on the case labels of different rolls are different, and the SKU for each set is different; and storing, for each set, associations between the SKU for the set and the batch numbers of the rolls of the set.

14. The method of claim 13 further comprising printing a unique code on each case label.

15. The method of claim 13 further comprising selecting a set of rolls of case labels based on the SKU for the set and distributing the rolls of the set at a harvest event.

16. The method of claim 15 further comprising labeling cases of produce from the harvest event with case labels from the distributed rolls and storing associations between the batch numbers and harvest event data for the harvest event.

* * * * *